United States Patent [19]
Price

[11] Patent Number: 5,702,617
[45] Date of Patent: Dec. 30, 1997

[54] PARTICULAR REMOVAL ASSEMBLY AND METHOD

[76] Inventor: Arnold James Price, P.O. Box 561, Muleshoe, Tex. 79347

[21] Appl. No.: 542,392

[22] Filed: Oct. 12, 1995

[51] Int. Cl.⁶ .................................................. B01D 21/00
[52] U.S. Cl. .................. 210/803; 210/767; 210/86; 210/295; 210/312; 210/446; 210/433.1
[58] Field of Search .................... 210/85, 86, 295, 210/312, 313, 435, 289, 728, 767, 803, 446, 433.1, 307; 166/267, 105.3, 56

[56] References Cited

U.S. PATENT DOCUMENTS

| | | | |
|---|---|---|---|
| 3,901,320 | 8/1975 | Calderon et al. | 210/408 |
| 3,980,457 | 9/1976 | Smith | 210/313 |
| 4,157,302 | 6/1979 | Bergstedt | 210/106 |
| 5,364,539 | 11/1994 | Castagno et al. | 210/86 |

*Primary Examiner*—Ana Fortuna
*Attorney, Agent, or Firm*—Novak Druce & Burt

[57] ABSTRACT

A particulate removal assembly for a fluid distribution system comprising a particulate collection chamber having an inlet through which particulate and fluid enter said collection chamber; a detector for sensing when said chamber has fried to a preselected degree with particulate; said chamber having an intermittent discharge responsive to said detector whereby the particulate is flushed from said chamber. The particulate removal assembly for a fluid distribution system further comprising a closure member for said intermittent discharge; said closure member actuated by fluid pressure delivered from said collection chamber.

10 Claims, 3 Drawing Sheets

PARTICULAR REMOVAL ASSEMBLY AND METHOD

BACKGROUND OF THE INVENTION

1. Field of Invention

This invention relates generally to methods and apparatus for separating particulate from fluid streams. More specifically, but not by way of limitation, it is directed to fluid stream sand separation and removal methods and apparatus which utilize one or more sand filters for facilitating sand separation.

2. Setting of Invention

Ground water utilized in crop irrigation often contains subterranean formation sand which can range in size from free to relatively coarse particles. If not removed, the sand in this ground water causes restriction of water flow and damage to the sprinkler heads of irrigation systems.

Various methods and apparatus which utilize filter means for separating particulate from fluid streams have been developed and used heretofore. These methods typically involve the use of one or more removable filters disposed within a separator vessel arranged so that the fluid stream containing particulate is made to slow down and change direction in a first compartment in the vessel and then flow from the first compartment through the filters into a second compartment from where the fluid stream is withdrawn. The particulate separates from the fluid stream and accumulates in the first compartment, where it is periodically removed by one of various means. Such means include the use of wash liquid to flush the particulate out, or manually opening the separator and removing the particulate.

Water used in irrigation systems, whether it be center pivot or lateral, typically contains appreciable quantities of sand. This sand tends to stay in suspension with the water until the flow of water stalls and the sand drops out into a trap due to gravity. Usually, this occurs at one end of the irrigation line. From the trap the sand is flushed out from the system, most commonly by opening a release valve thereby allowing the sand to exit.

Means employed in opening the release valve and flushing the system include both manual and electrical. With the manual flush, the irrigation system must be approached in a wetted field, typically while in operation. A hose or pipe may be attached to a valve on the system at a point where the line is flushed out. Extensive time between flushes must not elapse or additional effort to flush the sand out or bridging may occur. Additionally, sand flow from a given formation is not always consistent. Occasionally a slough occurs in the reservoir sending a large volume of sand through the irrigation system to be dispersed. Even with timely manual flushes, this risk of accumulation cannot be prevented. Regarding electrical valves used to disperse sand, this method has generally proven unreliable and/or costly. With either means, the metal valves employed to flush out the sand are easily scarred and tend to lock up due to the grit and abrasion of the sand.

There is a need for a particulate removal assembly and method which does not require continuous manual flushing, that operates consistently, and that does not allow accumulation or bridging of sand in the irrigation system. The present invention meets these requirements while being simple in construction and operation.

SUMMARY OF THE INVENTION

The present invention has been developed to overcome the foregoing deficiencies and meet the above described needs. The apparatus of the present invention is comprised of a particulate collection chamber having an inlet through which particulate and fluid enter said collection chamber. The collection chamber has two or more compartments therein for separation of the particulate from the liquid. Through said inlet, the liquid passes through a filter from the innermost chamber containing both particulate and liquid, to the outermost chamber containing only liquid.

A detector for sensing when the collection chamber has filled to a preselected degree with particulate is incorporated into the design. The chamber has an intermittent discharge responsive to the detector whereby the particulate is flushed from the collection chamber. A closure member for the intermittent discharge is provided, with the closure member actuated by fluid pressure delivered from the collection chamber. Actuation of the closure member creates an outlet whereby particulate is released from the collection chamber, and hence, the irrigation system.

The outlet from the collection chamber is of such smaller diameter than the inlet so as to slow down flow of the solution and allow the particulate to separate and settle from the liquid. In separating, the liquid passes to the outermost compartment from which it exits the collection chamber through a second outlet. The exiting liquid is then employed to drive the closure member so that the outlet from which the particulate exits is closed. Part of the liquid is allowed to exit through a sprinkler head rather than drive the closure member thereby allowing nearly continuous flow through the collection chamber.

As particulate accumulates in the innermost compartment of the collection chamber, liquid flow out of the collection chamber to the closure member is gradually reduced. Once the detector has determined that the sand has reached a predetermined level in the collection chamber, the closure member retracts from the outlet permitting the sand to flush out of the collection chamber and the irrigation system, as well as allowing the filter to be cleansed while releasing the particulate. The release is quickly accomplished by means of a venturi action of the flush due to the particulate outlet from the collection chamber being of smaller diameter than the inlet to the chamber. Liquid flow is then resumed to the closure member thereby closing the particulate outlet, and particulate is once again allowed to accumulate in the collection chamber.

With the present invention, the need for manual or electronic flushes is eliminated. Particulate is continually removed based upon the level collected in the collection chamber. As such, the problem of removing particulate from a reservoir slough is eliminated. Additionally, because metal valves are not employed to flush out particulate, no failure of equipment due to scarring or lockup from grit occurs.

Accordingly, the objectives of this invention are to provide, inter alia,

1. A collection chamber for the removal of particulate from a liquid stream that reduces or eliminates manually assisted flushing;
2. A collection chamber for the removal of particulate from a liquid stream that operates on very low pressure irrigation systems;
3. A collection chamber for the removal of particulate from a liquid stream that will not fail due to wear or abrasions from the particulate; and
4. A collection chamber for the removal of particulate from a liquid stream that is simple to install and operate.

Other objects and advantages will become apparent from the detailed description of the invention and the appended claims.

BRIEF DESCRIPTION OF THE DRAWING

The manner in which these objectives and other desirable characteristics can be obtained is explained in the following description and attached drawings in which.

DETAILED DESCRIPTION OF THE INVENTION

Figures 1, 1A:
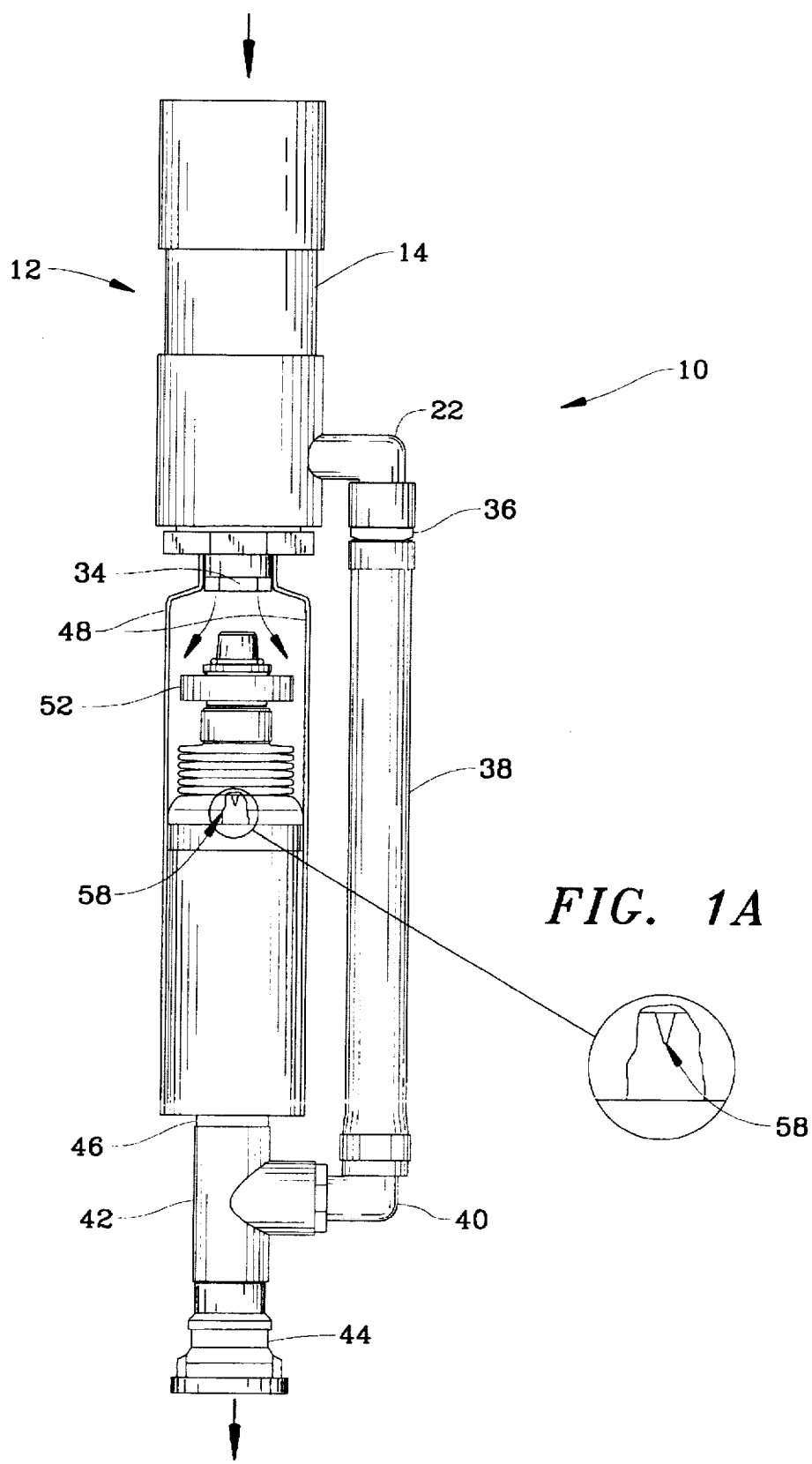
FIG. 1 is a perspective view of the particulate removal assembly in its vertical upstanding use position.
FIG. 1A is a sectional detailed enlarged view of that portion of FIG. 1 as circled.
Figure 2:
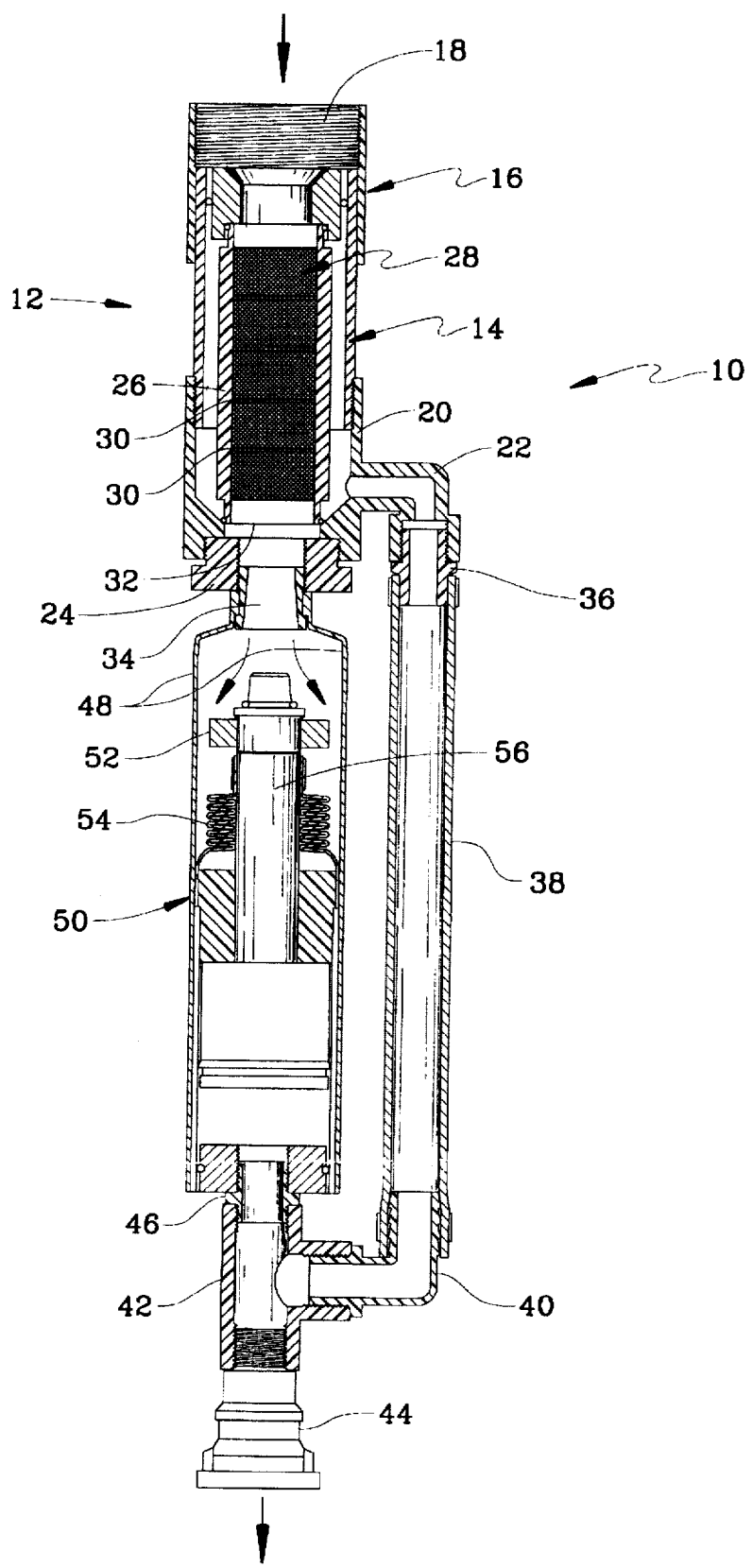
FIG. 2 is a sectional elevational view of the particulate removal assembly with the disposition of parts illustrated as during an intermittent discharge.
Figure 3:
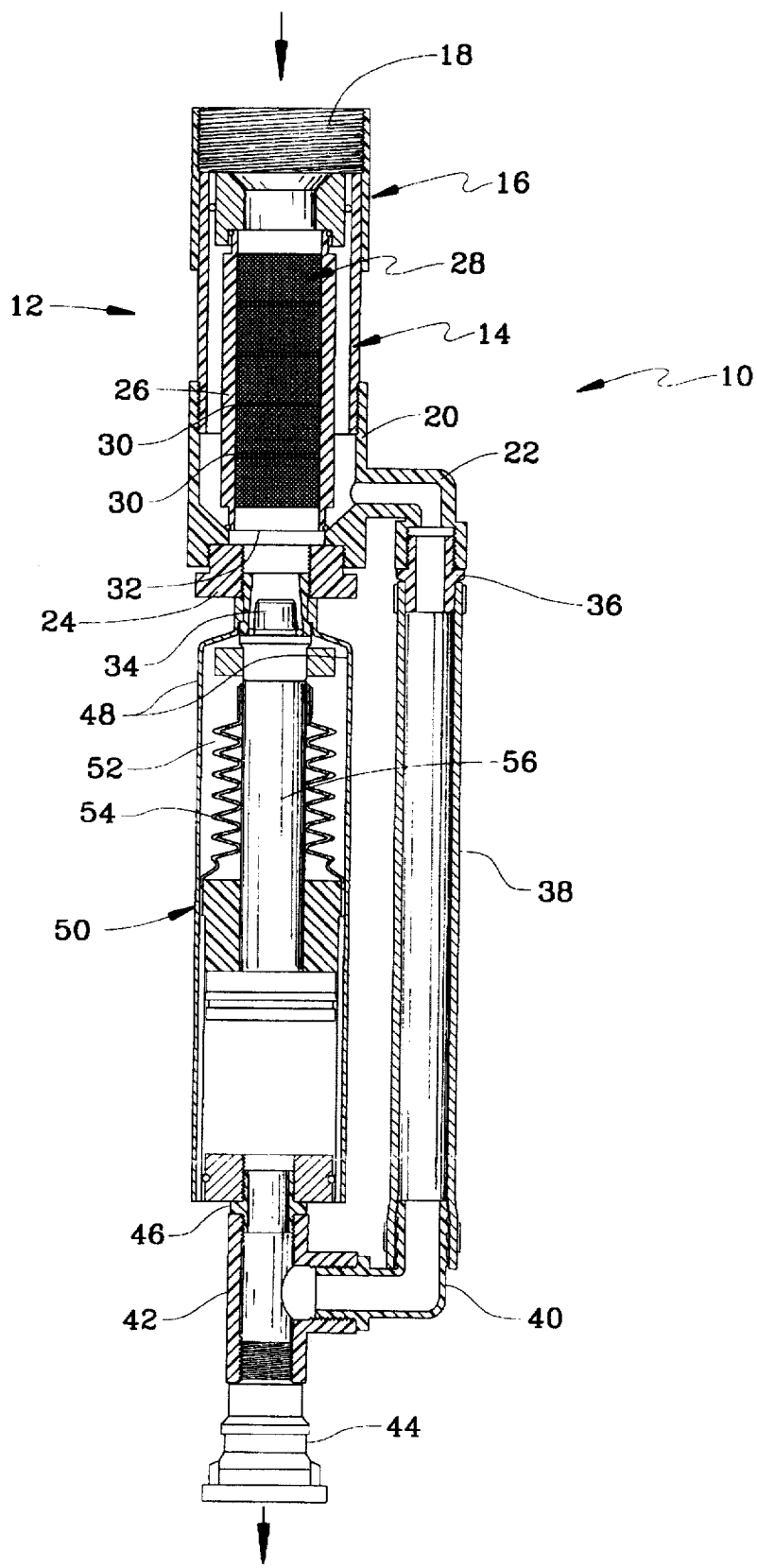
FIG. 3 is a view similar to FIG. 2 but illustrating various components in the positions they occupy during filling of the particulate collection chamber.

Referring now more specifically to the drawings wherein like reference numerals denote like elements throughout the several views, the figures illustrate a particulate removal assembly 10 in accordance with the present invention. The particulate removal assembly 10 includes an elongated collection chamber referred to in general by reference numeral 12. This chamber 12 comprises a tubular housing 14 with an upper end cap 16 through which a liquid and particulate inlet 18 is threadedly engaged. The opposite end of the housing 14 is threadedly engaged to a series of consecutively circumferentially smaller lower end caps 20 and 24. A particulate and liquid outlet 34 is threadedly engaged to the inside of the lower end caps 20 and 24. This outlet 34 is of such shape that its interior circumferences increases in diameter the further particulate and liquid move through it and away from the collection chamber 12.

The interior of the collection chamber 12 includes a central tubular filter 26 comprised of a fine mesh screen 28 or the like adjacent to a sectional cylindrical brace 30 for supporting said screen 28. The filter 26 is of such shape so that a lip 32 is the most restricted point of flow through the chamber 12.

The most exterior lower end cap 20 is comprised of a liquid outlet 22 threadedly engaged to the upper half of a connector 36. A longitudinal hosing 38 is secured to the lower half of the connector 36 by means of a hose clamp or similar means. The hosing 38 continues downwardly to where its lower end is secured to an elbow joint 40 by such means as a hose clamp.

The opposite end of the elbow joint 40 is threadedly engaged to a t-shaped diverter 42. The diverter 42 directs liquid either upwardly driving upward a piston 50, or downwardly where the liquid exits the assembly through a sprinkler head 44. The diverter 42 is threadedly engaged to the sprinkler head 44 at the diverter's lower end, and to the lower end of a piston connector 46 at the diverter's upper end. Likewise, the piston connector's upper end is threadedly engaged to the bottom of the piston 50.

The liquid and particulate outlet 34 is attached to the piston 50 by means of one or more longitudinal braces 48 boltedly secured to the piston 50. The braces 48 are bonded to the outlet 34 by means such as welding or similar means.

The piston's 50 best mode of operation employs a cup seal 54 as opposed to an o-ring seal since the cup seal requires less pressure to drive up the piston 50. One or more weep vents 58 as illustrated by FIG. 1A occur circumferentially about the downward end of the seal 54 covering the rod 58 of the piston 50. A splash guard 52 is circumferentially situated about the upwardmost end of the rod 56. This guard 52 serves in dispersing liquid and particulate exiting the collection chamber's outlet 34.

In operation, liquid and particulate enter in through the inlet 18 and passing into the interior of the filter 26. Due to the restriction of the filter's 16 lip 32, liquid flow is redirected through the filter 26 into the interior of the tubular housing 14 of the collection chamber 12. The liquid then exits the collection chamber 12 through the liquid outlet 22 down the hosing 38, and into the t-shaped diverter 42. Here the liquid's own pressure is used to drive the piston 50 upwardly to seal the liquid and particulate outlet 34. Because of the type of seal employed, only minimal pressure is required to drive the piston 50 to seal the outer 34. In addition, some of the liquid is diverted downwardly through the sprinkler head 44 where it exits the present invention.

Once the collection chamber 12 is sealed by the piston 50, particulate accumulates within the interior portion of the chamber 12 surrounded by the filter 26. As particulate accumulates, liquid pressure to the piston 50 decreases. Once particulate has accumulated to a predetermined level, water flow from the chamber 12 to the diverter 42 is impeded such that the sprinkler head 44 bleeds off water flow to the piston 50 allowing the piston 50 to retract and particulate to disperse rapidly from the chamber. Exiting particulate and liquid is spread circumferentially from the apparatus 10 by means of the splash guard 52. The rapid dispersal allows the filter 28 to be cleansed and the particulate collection process started again.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the

What is claimed is:

1. A particulate removal assembly for a fluid distribution system; said removal assembly comprising;

a particulate collection chamber having a filter therein an inlet through which particulate and fluid enter said collection chamber for separation thereon;

a detector for sensing when said chamber has filled to a preselected degree with particulate; said chamber having an intermittent particulate discharge outlet responsive to said detector whereby the particulate is flushed from said chamber; and a closure member for sealing said particulate discharge outlet;

a filtrate fluid outlet for removing filtered fluid;

said closure member adapted to be actuated by fluid pressure delivered from said filtered fluid removed from said collection chamber, and attached to said particulate discharge outlet by one or more longitudinal braces.

2. The particulate removal assembly for a fluid distribution system as recited in claim 1, wherein said closure member is biased toward a closed position by the fluid pressure delivered from filtered fluid from said collection chamber.

3. The particulate removal assembly for a fluid distribution system as recited in claim 1, wherein said closure member is a fluid driven piston.

4. The particulate removal assembly for a fluid distribution system as recited in claim 3, wherein said fluid driven piston further comprises at least one weep outlet that prevents prolonged accumulation of static fluid therein.

5. The particulate removal assembly for a fluid distribution system as recited in claim 1, wherein said closure member further comprises a particulate disperser.

6. The particulate removal assembly for a fluid distribution system as recited in claim 1, further comprising:
   a fluid diverter for conveying fluid from said chamber to said closure member.

7. The particulate removal assembly for a fluid distribution system as recited in claim 6, further comprising:
   a bleed fluidly connected to said diverter.

8. A sand removal assembly for an irrigation system, said removal assembly comprising:
   a sand trap having an inlet through which sand and fluid enter said trap, and are separated to produce a filtered fluid;
   a detector for sensing when said trap has filled to a particular degree with sand;
   said trap having an intermittent sand discharge responsive to said detector whereby the sand is flushed from said trap; and
   a closure member for sealing said sand discharge;
   and outlet for removing filtered fluid;
   said closure member adapted to be actuated by fluid pressure delivered from filtered fluid removed from said collection chamber, and attached to said sand discharge by one or more longitudinal braces.

9. A method for removing sand from a fluid, comprising the steps of:
   trapping the sand and fluid in a sand trap having a sand discharge and filtrate outlet;
   filtering the fluid from the sand in said sand trap;
   removing filtered fluid;
   pressurizing a piston by means of the filtered fluid;
   closing said sand discharge by means of said piston;
   filling said sand trap with the sand;
   reducing the flow of the filtered fluid from said sand trap; and
   depressurizing said piston thereby releasing the sand.

10. A fluid filter method as claimed in claim 9, further comprising the steps of:
   releasing the sand from said sand trap by means of a venturi action.

* * * * *

UNITED STATES PATENT AND TRADEMARK OFFICE
CERTIFICATE OF CORRECTION

PATENT NO. : 5,702,617
DATED : December 30, 1997
INVENTOR(S) : Arnold James Price It is certified that error appears in the above-identified patent and that said Letters Patent is hereby corrected as shown below:

On the title page, item [54] and column 1, title should read --PARTICULATE REMOVAL ASSEMBLY AND METHOD --.

Signed and Sealed this

Seventeenth Day of March, 1998

*Attest:*

BRUCE LEHMAN

*Attesting Officer*   Commissioner of Patents and Trademarks